United States Patent
Wang et al.

(10) Patent No.: US 10,873,184 B2
(45) Date of Patent: Dec. 22, 2020

(54) POWER ELECTRONICS CONVERTER BASED RECONFIGURABLE GRID EMULATION PLATFORM

(71) Applicant: University of Tennessee Research Foundation, Knoxville, TN (US)

(72) Inventors: Fei Wang, Knoxville, TN (US); Leon M. Tolbert, Knoxville, TN (US); Yiwei Ma, Knoxville, TN (US); Kevin Tomsovic, Knoxville, TN (US); Kai Sun, Knoxville, TN (US); Shuoting Zhang, Knoxville, TN (US); Jingxin Wang, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 120 days.

(21) Appl. No.: 16/165,547

(22) Filed: Oct. 19, 2018

(65) Prior Publication Data

US 2020/0127456 A1  Apr. 23, 2020

(51) Int. Cl.
| | | |
|---|---|---|
| H02J 3/00 | (2006.01) | |
| G05B 13/04 | (2006.01) | |
| H02J 3/36 | (2006.01) | |
| H02J 3/38 | (2006.01) | |
| H02M 7/537 | (2006.01) | |

(52) U.S. Cl.
CPC .............. *H02J 3/00* (2013.01); *G05B 13/041* (2013.01); *H02J 3/36* (2013.01); *H02J 3/385* (2013.01); *H02J 3/386* (2013.01); *H02M 7/537* (2013.01); *H02J 2203/20* (2020.01)

(58) Field of Classification Search
CPC .... H02J 3/00; H02J 3/38; H02J 3/383; H02M 7/44; G01R 21/133; H04L 63/14; H04L 63/205; H04L 29/06; H04L 29/08
USPC ................ 307/113, 115, 64, 66; 363/95, 97
See application file for complete search history.

(56) References Cited

U.S. PATENT DOCUMENTS

| | | | |
|---|---|---|---|
| 6,643,145 B1* | 11/2003 | Harrison ............... | H02M 3/157 363/16 |
| 2010/0332211 A1 | 12/2010 | Oudalov et al. | |
| 2013/0063993 A1* | 3/2013 | Liu ....................... | G01R 31/085 363/95 |
| 2013/0258732 A1* | 10/2013 | Zhu ........................ | G01R 31/42 363/95 |
| 2014/0375131 A1* | 12/2014 | Spanoche ............. | H02M 3/158 307/52 |

(Continued)

OTHER PUBLICATIONS

Li et al. "Development, Demonstration, and Control of a Testbed for Multiterminal HVDC System" IEEE Transactions on Power Electronics, 32(8):6069-6078 (2017).

(Continued)

*Primary Examiner* — Rexford N Barnie
*Assistant Examiner* — Jagdeep S Dhillon
(74) *Attorney, Agent, or Firm* — Myers Bigel, P.A.

(57) ABSTRACT

A system includes a controller that is configured to generate a node control signal and a plurality of switch control signals, a plurality of programmable emulators, each of the plurality of programmable emulators being configurable as one of a plurality of node types responsive to the node control signal, and a plurality of switches that are programmable to couple ones of the plurality of programmable emulators to each other responsive to the plurality of switch control signals.

26 Claims, 15 Drawing Sheets

(56) References Cited

U.S. PATENT DOCUMENTS

| | | | |
|---|---|---|---|
| 2017/0250540 A1* | 8/2017 | Varma | H02M 7/44 |
| 2018/0115588 A1* | 4/2018 | Wysocki | H04L 63/1416 |
| 2018/0233908 A1* | 8/2018 | Chik | G01R 21/133 |

OTHER PUBLICATIONS

Yang et al. "Development of converter based reconfigurable power grid emulator" 2014 IEEE Energy Conversion Congress and Exposition (ECCE), Sep. 14, 2014; pp. 3990-3997.

Zhang et al. "Development of a hybrid emulation platform based on RTDS and reconfigurable power converter-based testbed" 2016 IEEE Applied Power Electronics Conference and Exposition (APEC), Mar. 20, 2016, pp. 3121-3127.

International Search Report and Written Opinion corresponding to PCT/US2019/056266, dated Jan. 22, 2020 (16 pages).

Ma et al. "Converter-Based Reconfigurable Real-Time Electrical System Emulation Platform" Chinese Journal of Electrical Engineering, 4(1):20-27 (2018).

* cited by examiner

POWER ELECTRONICS CONVERTER BASED RECONFIGURABLE GRID EMULATION PLATFORM

STATEMENT REGARDING FEDERALLY SPONSORED RESEARCH OR DEVELOPMENT

This invention was made with government support under contract number NSF EEC-1041877 awarded by the National Science Foundation. The government has certain rights in the invention.

BACKGROUND

The present disclosure relates to power systems, and, in particular, to emulation of power systems.

Offline digital simulations have been used to predict the behavior of electrical systems in time domain due to their generally low cost, easy accessibility, and flexible configuration. However, due to the limitations of the computational resources and run time, the simulation accuracy and fidelity may suffer from different levels of model reductions. In some circumstances, the results depend on the solver and time steps selected, and may have numerical stability and convergence issues. Also, the simulation may be unreasonable time-consuming. Integrated circuit devices, such as microprocessors or Field-Programmable Gate Arrays (FPGAs), have enabled real-time digital simulations. With deliberately designed network solutions and parallel computing techniques, these tools can simulate a relatively large system in real-time with fixed time-steps. They can incorporate digital and analog inputs and outputs to connect with the physical world to form a Hardware in the Loop (HIL) simulation. This may allow the real-time testing of developed system controllers without having to develop a real hardware test platform. Because the digital simulations still use mathematical models, the numerical stability of the digital simulations may be problematic. These non-real-time or real-time digital simulation tools may offer a large diversity of pre-defined models, and may have the capability to integrate user built models. Nevertheless, many critical conditions in the simulations tend to be simplified or ignored by the users, such as measurement errors, control and communication time delays, device physical bounds and saturation, electromagnetic interference. Accounting for the uncertainties in the simulations may be computationally challenging, but failing to address these issues may cause unrealistic or incorrect results. Conversely, hardware-based system testing can reveal the impact of the neglected aspects of digital simulations. A hardware-based validation may be required before the deployment of any proposed controllers or developed devices. To assist with such a testing or verification need, a real-time digital simulator can be paired with a power amplifier to form a Power HIL (PHIL) test platform. The PHIL platform can be connected to an Equipment under Test (EUT) and may be used to evaluate its behavior with the remainder of the system represented by the simulator. While the PHIL platform may have improved fidelity to test the equipment, the overall system simulation accuracy may not be better than that of a digital simulation. To study overall system behavior, researchers have built a down-scaled power testbed, which has been modified over time to incorporate new technologies. Examples include the National Renewable Energy Laboratory's (NREL) Energy Systems Integration Facility (ESIF) and the Consortium for Electric Reliability Technology Solutions' (CERTS) microgrid testing platform. While these down-scaled hardware-based testing platforms may provide superior fidelity, they are generally bulky and costly. Their topology and configurations are generally difficult to change, usually requiring physical rewiring and component replacements for testing in a different system configuration or using different parameters. Another challenging simulation issue is resealing. To precisely represent a power component with different power and voltage, the emulator should have the same per unit value of the original one. This may be relatively easy for the passive components like resistors, inductors, and capacitors, but may be more difficult for rotating machines with different impedances, inertia, and saturation levels. Transmission lines may also pose challenges as many cascaded circuits made up of inductors and capacitors may be required to represent the distributed parameters.

SUMMARY

In some embodiments of the inventive concept, a system comprises a controller that is configured to generate a node control signal and a plurality of switch control signals, a plurality of programmable emulators, each of the plurality of programmable emulators being configurable as one of a plurality of node types responsive to the node control signal, and a plurality of switches that are programmable to couple ones of the plurality of programmable emulators to each other responsive to the plurality of switch control signals.

In other embodiments, the plurality of programmable emulators comprises a first plurality of programmable emulators, the system further comprising a second plurality of programmable emulators, each of the second plurality of programmable emulators being configurable as a long-distance transmission line emulator, a Direct Current (DC) line emulator, a high voltage DC converter emulator, or a short-distance transmission line emulator. The plurality of switches are further programmable to couple ones of the second plurality of programmable emulators to each other responsive to the plurality of switch control signals from the controller and to couple the ones of the first plurality of programmable emulators to the ones of the second plurality of programmable emulators to each other responsive to the plurality of switch control signals from the controller.

In still other embodiments, the long-distance transmission line emulator, DC line emulator, and high voltage DC converter emulator each comprise a pair of power converters coupled together.

In still other embodiments, the controller is further configured to generate a long distance transmission line control signal and the long-distance transmission line emulator is configurable as a T model transmission line, a distributed model transmission line, or a Flexible Alternating Current Transmission System (FACTS) model transmission line responsive to the long distance transmission line control signal.

In still other embodiments, the short-distance transmission line emulator comprises at least one inductor.

In still other embodiments, the controller is further configured to generate a short-distance transmission line signal, the short-distance transmission line emulator comprises a plurality of inductors, and the plurality of switches are further programmable to couple ones of the plurality of inductors to each other to adjust a transmission line length of the short-distance transmission line emulator responsive to the short-distance transmission line signal.

In still other embodiments, the plurality of node types comprises a plurality of sources and a plurality of loads.

In still other embodiments, the plurality of sources comprises a coal-fired power generator, a gas power generator, a nuclear power generator, and a plurality of distributed energy resources.

In still other embodiments, the plurality of distributed energy resources comprises a wind power generator, a photovoltaic power generator, a biomass power generator, a biogas power generator, a geothermal power generator, a hydroelectric power generator, and an electricity storage system.

In still other embodiments, the electricity storage system comprises a battery, an ultracapacitor, a flywheel, a compressed air storage device, and/or a responsive load.

In still other embodiments, the plurality of loads comprises a constant impedance load, a constant current load, a constant power load, a three-phase induction motor load, a single-phase induction motor load, and/or a power electronic fed load.

In still other embodiments, the power electronic fed load comprises a variable speed drive, a data center power supply, a consumer electronics power supply, and/or an electric vehicle charger.

In still other embodiments, each of the plurality of programmable emulators comprises a power converter.

In still other embodiments, the power converter comprises a three-phase Direct Current/Alternating Current (DC/AC) converter.

In still other embodiments, the controller is further configured to generate a mode control signal. Each of the plurality of programmable emulators is further configurable as one of a plurality of operating modes responsive to the mode control signal.

In still other embodiments, the plurality of operating modes comprises Maximum Power Point Tracking (MPPT), power curtailment, droop control, inertia emulation, power factor control, voltage control, frequency control, and/or reactive power support.

In still other embodiments, the system further comprises a Real Time Digital Simulation (RTDS) system that is coupled to the plurality of programmable emulators and is configured to digitally emulate a power system source, load, or fault.

In some embodiments of the inventive concept, a method comprises generating, using a controller, a node control signal and a plurality of switch control signals, configuring each of a plurality of programmable emulators as one of a plurality of node types responsive to a node control signal from a controller responsive to the node control signal, and programming a plurality of switches to couple ones of the programmable emulators to each other responsive to the plurality of switch control signals.

In further embodiments, the plurality of programmable emulators comprises a first plurality of programmable emulators. The method further comprises configuring each of a second plurality of programmable emulators as a long-distance transmission line emulator, a Direct Current (DC) line emulator, a high voltage DC converter emulator, or a short-distance transmission line emulator, programming the plurality of switches to couple ones of the second plurality of programmable emulators to each other responsive to the plurality of switch control signals, and programming the plurality of switches to couple the ones of the first plurality of programmable emulators to the ones of the second plurality of programmable emulators to each other responsive to the plurality of switch control signals.

In still further embodiments, the long-distance transmission line emulator, DC line emulator, and high voltage DC converter emulator each comprise a pair of power converters coupled together.

In still further embodiments, the method further comprises generating, using the controller, a long distance transmission line control signal and configuring the long-distance transmission line emulator as a T model transmission line, a distributed model transmission line, or a Flexible Alternating Current Transmission System (FACTS) model transmission line responsive to a long distance transmission line control signal from the controller.

In still further embodiments, the short-distance transmission line emulator comprises at least one inductor.

In still further embodiments, the short-distance transmission line emulator comprises a plurality of inductors. The method further comprises generating, using the controller, a short-distance transmission line signal and programming the plurality of switches to couple ones of the plurality of inductors to each other to adjust a transmission line length of the short-distance transmission line emulator responsive to the short-distance transmission line signal.

In still further embodiments, the method further comprises generating, using the controller, a mode control signal and configuring each of the plurality of programmable emulators as one of a plurality of operating modes responsive to the mode control signal.

In some embodiments of the inventive concept, a computer program product comprises a tangible computer readable storage medium comprising computer readable program code embodied in the medium that is executable by a processor to perform operations comprising: generating, using a controller, a node control signal and a plurality of switch control signals, configuring each of a plurality of programmable emulators as one of a plurality of node types responsive to a node control signal from a controller responsive to the node control signal, and programming a plurality of switches to couple ones of the programmable emulators to each other responsive to the plurality of switch control signals.

In other embodiments, the plurality of programmable emulators comprises a first plurality of programmable emulators. The operations further comprise configuring each of a second plurality of programmable emulators being configurable as a long-distance transmission line emulator, a Direct Current (DC) line emulator, a high voltage DC converter emulator, or a short-distance transmission line emulator, programming the plurality of switches to couple ones of the second plurality of programmable emulators to each other responsive to the plurality of switch control signals, and programming the plurality of switches to couple the ones of the first plurality of programmable emulators to the ones of the second plurality of programmable emulators to each other responsive to the plurality of switch control signals.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1A:
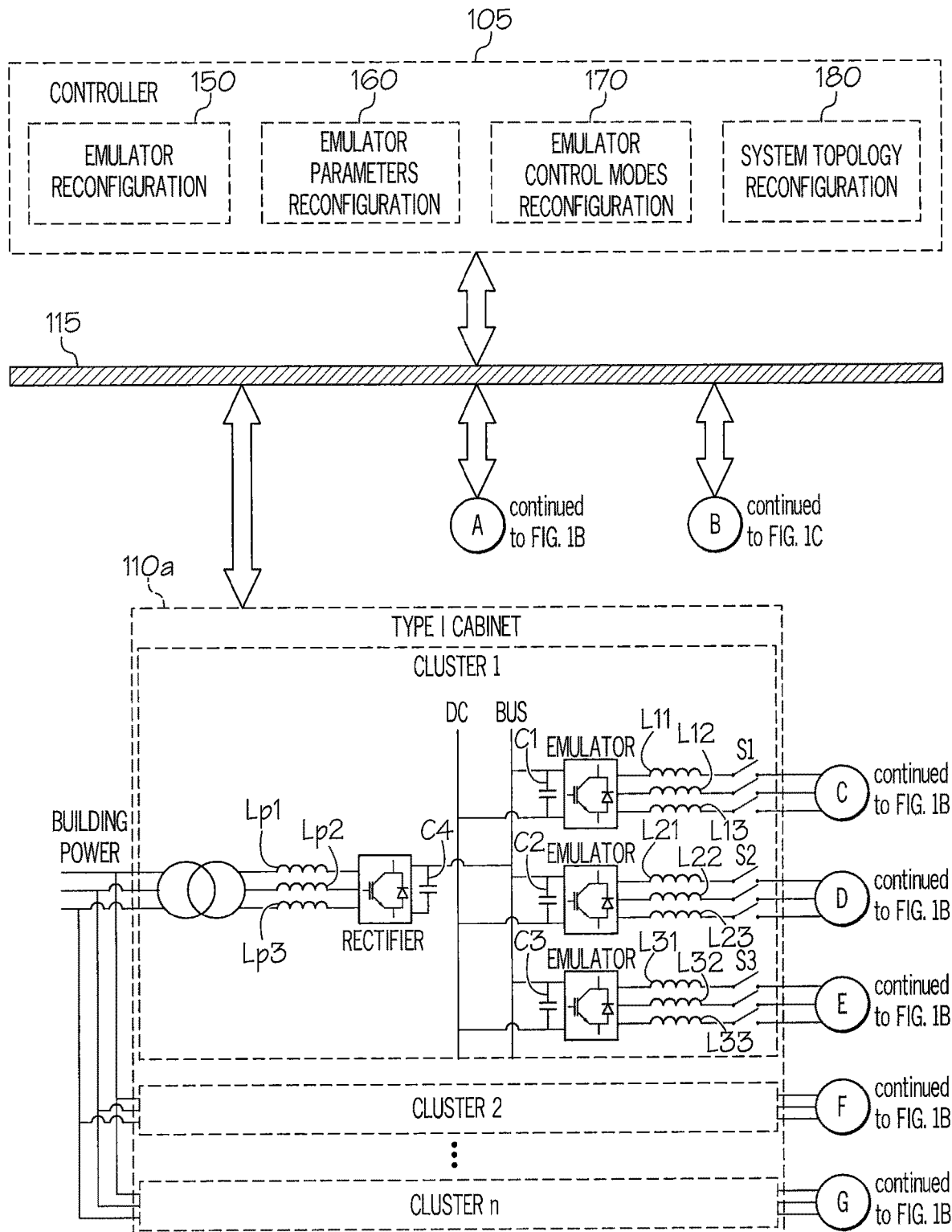
FIGS. 1A, 1B, and 1C are block diagrams that illustrates a network environment for a power electronics converter based reconfigurable grid emulation platform in accordance with some embodiments of the inventive concept.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term a data processing system may include, but it is not limited to, a hardware element, firmware component, and/or software component.

As used herein, the term "load" refers to any system, device, apparatus, or the like that consumes power.

As used herein a microgrid is an energy or power distribution network that may include one or more distributed energy resources and loads that are capable of operating in concert with or independently of a main power grid.

As used herein a distributed energy resource (DER) is a decentralized power generation source that typically outputs less power than the centralized power stations used in the main power grid to distribute power over large distances, such as coal-fired, gas, and nuclear powered plants. A DER system typically has a capacity of 10 MW or less and is located relatively close to the loads that it serves. A DER system may be part of a microgrid and may be used to provide power to the microgrid loads when the microgrid is connected to the main power grid and also at times when the microgrid is disconnected from the main power grid and operating in islanded mode. DER systems typically use diesel generator sets, natural gas microturbines, fuel cells, or renewable energy resources to generate power including, but not limited to, wind, photovoltaic (solar), biomass, biogas, geothermal, and/or hydroelectric. An electricity storage system (ESS), which can be used to store excess power that is generated during times of low demand, for example, may also be classified as a DER system. The electricity storage system may comprise a battery, an ultracapacitor, a flywheel, a compressed air storage device and/or a responsive load.

Some embodiments of the inventive concept stem from a realization that a network of programmable emulators based on power converters and connected by switches under the operational supervision of a controller may provide a flexible emulation platform for electrical systems, such as power grids. The power converter based reconfigurable grid emulation platform may provide a more realistic simulation without the numerical stability and convergence issues associated with computer software based simulation systems while providing more flexibility and model fidelity than a scaled hardware based testing platform. The power converter based reconfigurable grid emulation platform, according to some embodiments of the inventive concept, may further provide efficient automated reconfiguration when reconfiguring the power converters to emulate different types of elements, systems, operational modes, and/or control parameters as well as reconfiguring an entire system network to a different topology. This may reduce idle time when transforming an emulation platform from one test environment to another test environment.

Figure 1B:
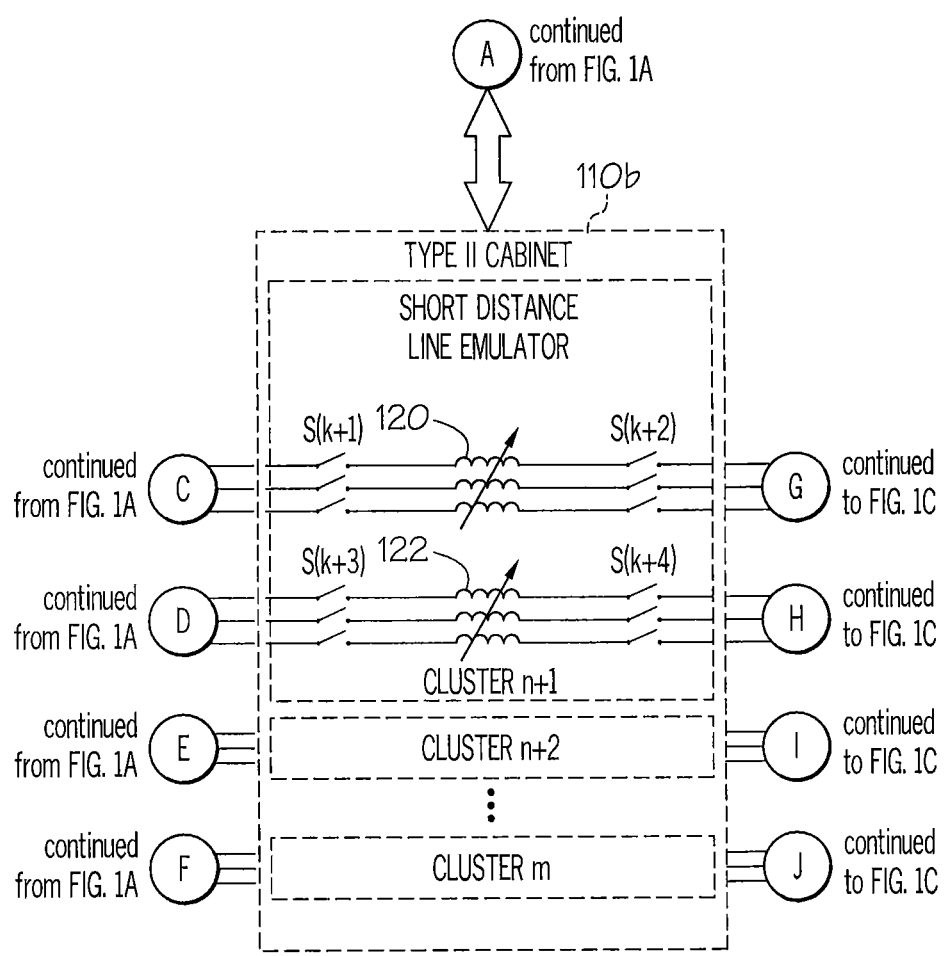
Figure 1C:
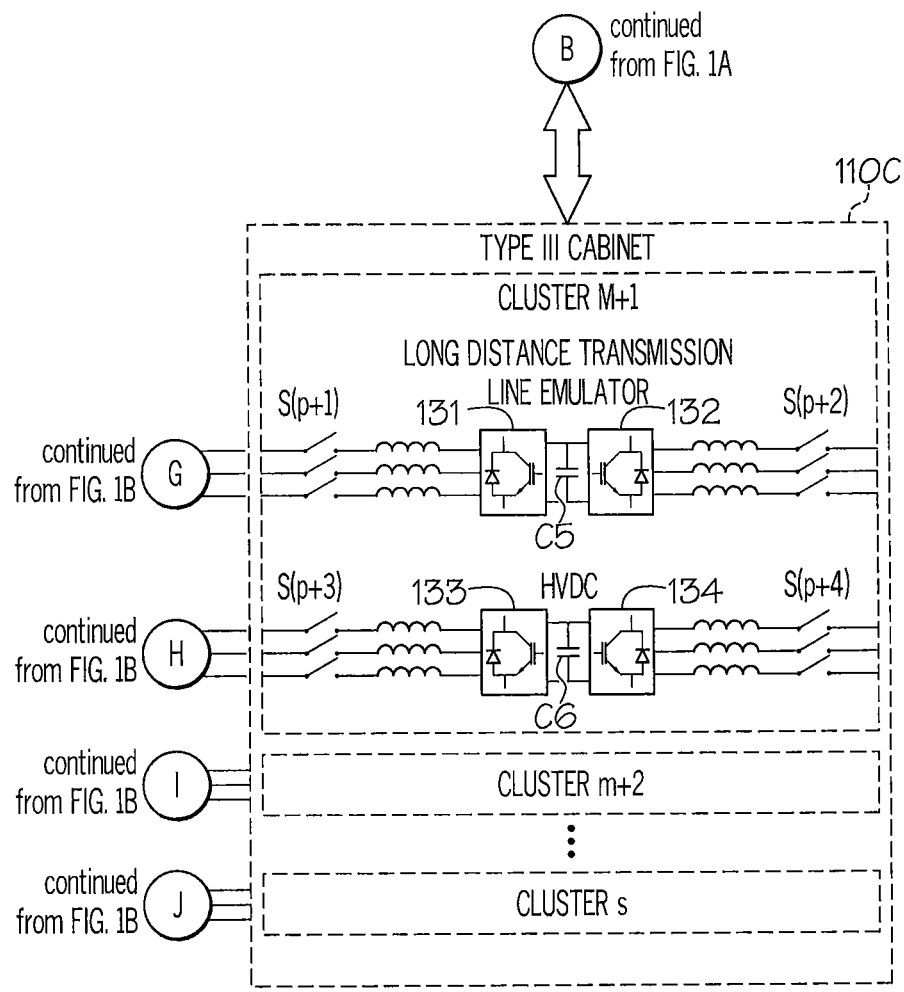

Referring to FIGS. 1A, 1B, and 1C a network environment for a power electronics converter based reconfigurable grid emulation platform, according to some embodiments of the inventive concept, comprises a central controller 105 and a plurality of cabinets 110a, 110b, and 110c, Type I, Type II, and Type III, which are coupled by a bus 115. The Type I cabinet 110a comprises a plurality of Clusters 1 through n with each cluster comprising one or more programmable emulators. In the example shown in FIGS. 1A, 1B, 1C, Cluster 1 includes three emulators (Emulators 111, 112, and 113), which are connected to a power supply by way of a DC bus and a rectifier as shown. Inductors Lp1, Lp2, Lp3 and capacitor C4 may provide filtering functionality in the connection of the Emulators 111, 112, and 113 to the power supply. Emulator 1 is coupled to a set of inductors L11, L12, and L13 and a capacitor C1, Emulator 2 is coupled to a set of inductors L21, L22, and L23 and a capacitor C2, and Emulator 3 is coupled to a set of inductors L31, L32, and L33 and a capacitor C3. Thus, each of the clusters Cluster 2 through Cluster n may be configured with a rectifier and one or more filtering inductors and capacitors to support the emulators associated therewith. Each of the emulators in the Type I cabinet may be used to emulate a node representing one or more sources, e.g., power generation sources, or loads. The loads may include, but are not limited to, a constant impedance load, a constant current load, a constant power load, a three-phase induction motor load, a single-phase induction motor load, and/or a power electronic fed load. The power electronic fed load may include, but is not limited to, a variable speed drive, a data center power supply, a consumer electronics power supply, and/or an electric vehicle charger. The Type II cabinet 110b comprises a plurality of Clusters n+1 through m with each cluster comprising one or more variable length inductors 120, 122. Each of these variable length inductors may be used to emulate a short-distance transmission line. The Type III cabinet 110 comprises a plurality of Clusters m+1 through s with each cluster comprising one or more pairs of emulators coupled back to back. As shown in FIG. 1C, Cluster m+1 includes emulators 131 and 132 coupled back to back with a filtering capacitor C5 therebetween and emulators 133 and 134 coupled back to back with a filtering capacitor C6 therebetween. Emulator 131 is coupled to a set of inductors L41, L42, and L43, Emulator 132 is coupled to a set of inductors L51, L52, and L53, and Emulator 133 is coupled to a set of inductors L61, L62, and L63, and Emulator 134 is coupled to a set of inductors L71, L72, and L73. The pair of back-to-back emulators 131 and 132 in the Type III cabinet may be used to emulate a long-distance transmission line. The pair of back-to-back emulators 133 and 134 may be used to emulate DC lines and/or high voltage DC converters. The Type I cabinet 110a, Type II cabinet 110b, and Type III cabinet 110c may comprise a plurality of switches S1, S2, S3, S(k+1), S(k+2), S(k+3), S(k+4), S(p+1), S(p+2), S(p+3), S(p+4), which may allow the various emulated nodes of the Type I cabinet 110a, the short-distance transmission lines of the Type II cabinet 110b, and the long-distance transmission lines of the Type III cabinet 110c to be coupled to one another.

The central controller 105 may comprise a data processing system including a processor and a memory coupled thereto. The processor communicates with the memory via an address/data bus. The processor may be, for example, a commercially available or custom microprocessor. The memory is representative of the one or more memory devices containing the software and data used for managing a power electronic converter based reconfigurable grid emulation platform in accordance with some embodiments of the inventive concept. The memory may include, but is not limited to, the following types of devices: cache, ROM, PROM, EPROM, EEPROM, flash, SRAM, and DRAM. As shown in FIGS. 1A, 1B, and 1C, the central controller 105 may comprise an emulator reconfiguration module 150, an emulator parameters reconfiguration module 160, an emulator control modes reconfiguration module 170, and a system topology reconfiguration module 180. As will be described herein, the emulator reconfiguration module 150 and the emulator parameters reconfiguration module 160 may be configured to control the configuration of the various emulated nodes of the Type I cabinet 110a, the short-distance transmission lines of the Type II cabinet 110b, and the long-distance transmission lines of the Type III cabinet 110c. The emulator control modes reconfiguration module 170 may be configured to control an operational mode configuration of the various emulated nodes of the Type I cabinet 110a. The system topology reconfiguration module 180 may be configured to control the programming states of the plurality of switches S1, S2, S3, S(k+1), S(k+2), S(k+3), S(k+4), S(p+1), S(p+2), S(p+3), S(p+4) in the Type I cabinet 110a, Type II cabinet 110b, and Type III cabinet 110c to connect the various emulated nodes, emulated short-distance transmission lines, and emulated long-distance transmission lines in a desired topology to emulate, for example, a power grid, micro-grid, or combined power grid and micro-grid.

Although FIGS. 1A, 1B, 1C illustrate hardware/software architectures that may be used in data processing systems, such as the central controller 105 of FIGS. 1A, 1B, 1C, for managing a power electronic converter based reconfigurable grid emulation platform in accordance with some embodiments of the inventive concept, it will be understood that the present invention is not limited to such a configuration but is intended to encompass any configuration capable of carrying out operations described herein. Computer program code for carrying out operations of data processing systems described herein may be written in a high-level programming language, such as Python, Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the central controller 105 of FIG. 1 may be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system." It will be further understood that the functionality provided by various modules of the central controller 105 may, in other embodiments, be performed in whole or in part on other processors, such as in the various emulators of the Type I cabinet 110a, Type II cabinet 110b, and Type III cabinet 110c.

The central controller 105 of FIG. 1A may be used to facilitate the management of a power electronic converter based reconfigurable grid emulation platform, according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media.

Figure 2:
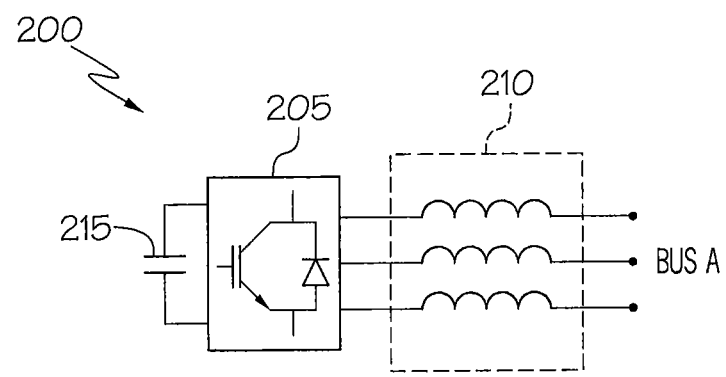
FIG. 2 is a schematic of a programmable emulator of FIG. 1A for use as a power source or load according to some embodiments of the inventive concept.
Figure 3:
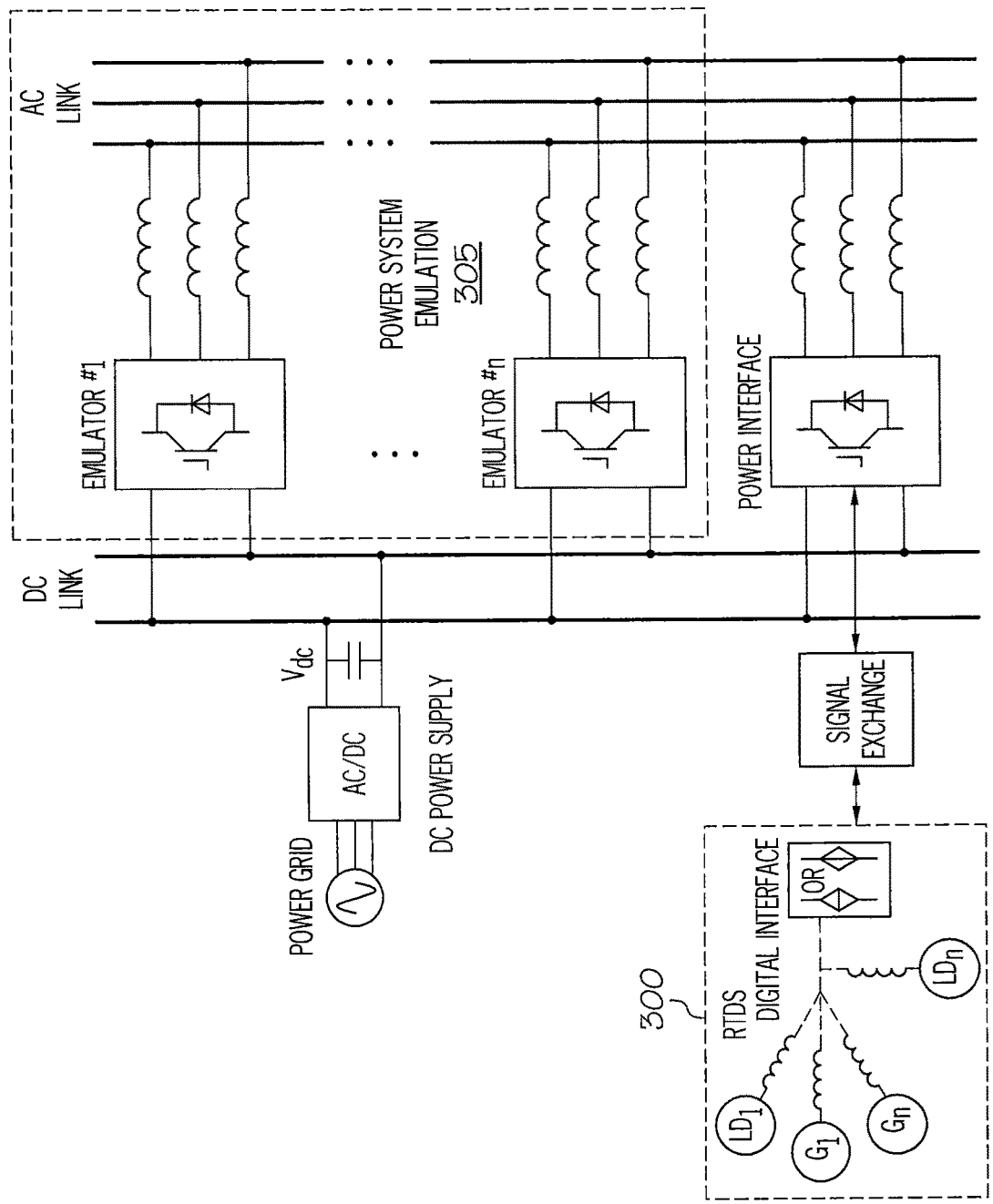
FIG. 3 is a schematic of a hybrid power electronics converter based reconfigurable grid emulation platform including a Real Time Digital Simulation (RTDS) system.

FIG. 2 is a schematic of a programmable emulator, such as the programmable emulators 111, 112, and 113 of FIG. 1A, for use as a power source or load in an emulation platform according to some embodiments of the inventive concept. The programmable emulator 200 comprises a power converter 205, filter inductors 210, and filter capacitor 215 that are connected as shown. A load or source may be emulated based on its voltage and current characteristics. For example, the input current and voltage to the power converter 205 may be measured and the power converter 205 may then be configured to generate an output current or voltage that is proportional to a source or load being emulated. The components in an electrical system may be considered as either voltage source components or current source components. The power converter 205 may have two types of control schemes: a first type regulates the terminal voltage and a second type regulates the output current. In some embodiments, the power converter 205 may measure the emulated input voltage and/or current and generate a desired emulated output current when emulating a load. In other embodiments, the power converter 205 may measure the emulated input voltage and/or current and generated a desired emulated output voltage when emulating a source, e.g., a power generator. The power converter may be a three-phase DC/AC converter in some embodiments of the inventive concept FIG. 3 is a schematic of a hybrid power electronics converter based reconfigurable grid emulation platform including a Real Time Digital Simulation (RTDS) system. The hybrid system includes an RTDS digital power system simulator 300 that may simulate one or more power generation sources G1-Gn and one or more loads LD1-LDn. The RTDS power system simulator 300 may communicate with a power electronics converter based reconfigurable grid emulation platform 305 including emulators 1-n as described above with respect to the emulators of cabinets 110a, 110b, and 110c via a signal change and a power interface module. The emulators 1-n are supported by a DC power supply and communicate with each other and the RTDS power system simulator 300 via an AC link. Thus, a power system may be emulated using both physical power electronics converters as well a digital simulation system to provide additional flexibility the size, scope, and types of power sources, loads, faults, and the like being emulated.

Figure 4:
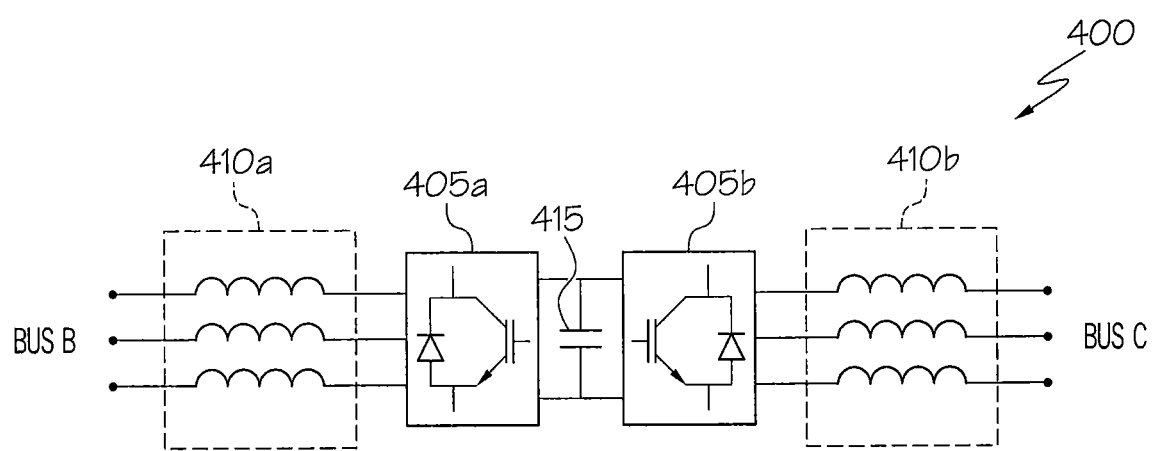
FIG. 4 is a schematic of a programmable emulator of FIG. 1C for use as a long-distance transmission line and/or a DC line or high voltage DC converter according to some embodiments of the inventive concept.

FIG. 4 is a schematic of a programmable emulator, such as the programmable emulators 131, 132, 133, and 134 of FIG. 1, for use as a long-distance transmission line, a DC line, and/or a high voltage DC converter in an emulation platform according to some embodiments of the inventive concept. The programmable emulator 400 comprises a power converter 405a and filter inductors 410a that are coupled to a power converter 405b and filter inductors 410b along with a filter capacitor 415 therebetween. The programmable emulator 400 that may be used to emulate a long-distance transmission line, a DC line, and/or a high voltage DC converter may comprise two power emulators 200 of FIG. 2 used to emulate a load or source coupled back-to-back.

Figure 5:
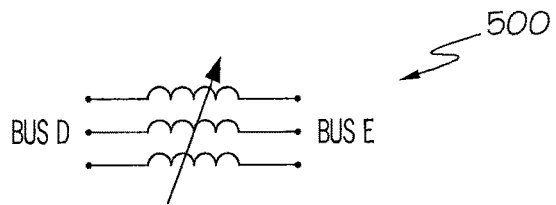
FIG. 5 is a schematic of a programmable emulator of FIG. 1B for use as a short-distance transmission line according to some embodiments of the inventive concept.

FIG. 5 is a schematic of a programmable emulator, such as the programmable emulators 120 and 122 of FIG. 1B, for use as a short-distance transmission line in an emulation platform according to some embodiments of the inventive concept. The programmable emulator 500 comprises a plurality of inductors that may be coupled in various configurations using one or more of the switches S(k+1), S(k+2), S(k+3), S(k+4) of FIG. 1B so as to have a desired length.

Figure 6:
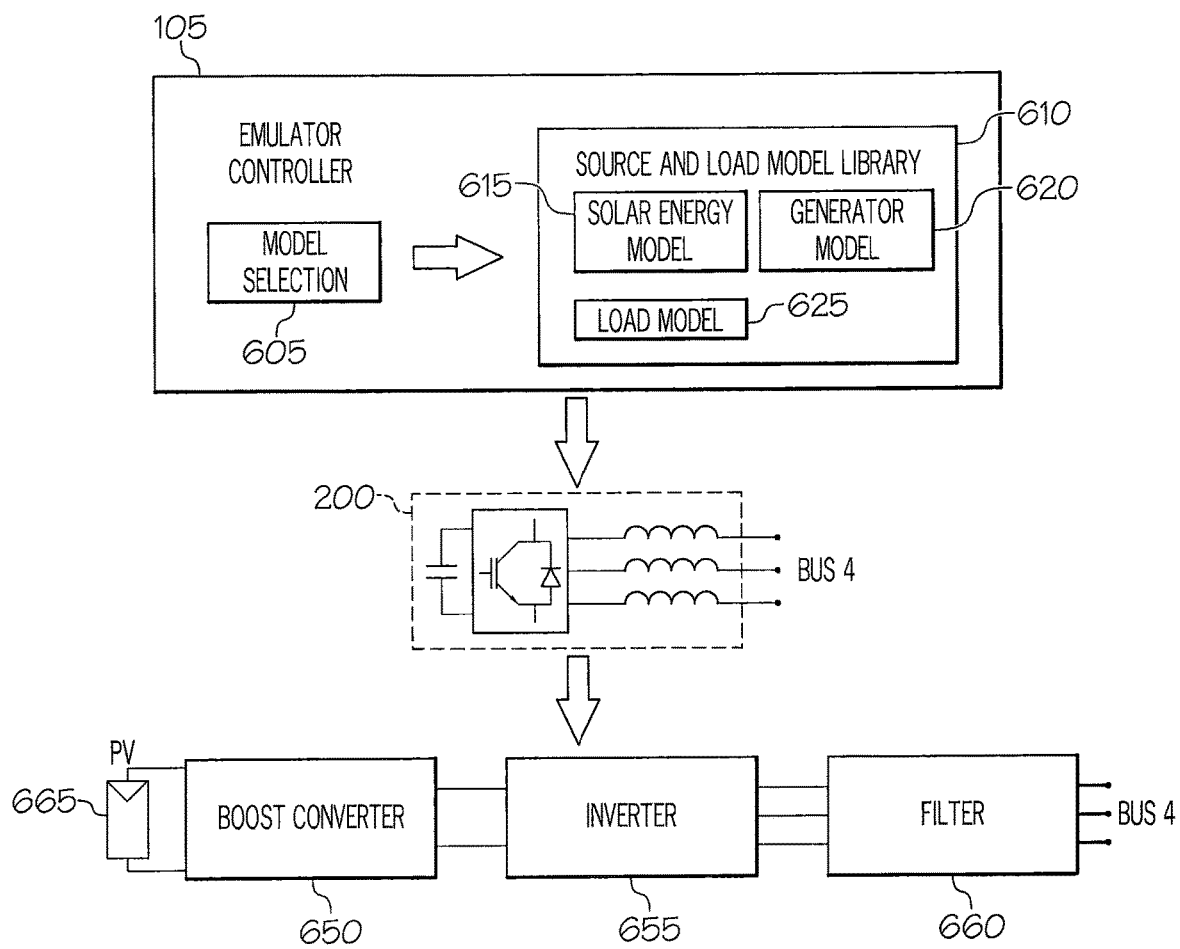
FIG. 6 is a block diagram that illustrates a programming of a programmable emulator as a photovoltaic power generator according to some embodiments of the inventive concept.

FIG. 6 is a block diagram that illustrates a programming of a programmable emulator, such as the programmable emulators 111, 112, and 113 of FIG. 1A, for use as a photovoltaic power generator in an emulation platform according to some embodiments of the inventive concept. The emulator reconfiguration module 150 along with the emulator parameters reconfiguration module 160 of FIG. 1A may include a library that can be used to program the emulators in the Type I cabinet 110a to serve as a particular node type in an electrical system, such as an electrical power grid. Thus, the emulator reconfiguration module 150 along with the emulator parameters reconfiguration module 160 may incorporate access to a model selection module 605 to select among a library 610 of various source and load types that can be used for configuring the Type I cabinet 110a emulators. As shown in FIG. 6, a solar or photovoltaic energy model 615, a general generator (i.e., source) model 620, and a general load model 625 are shown as options with the solar energy model 615 being selected. It will be understood, however, that the various node types are not limited to these particular models. For example, in some embodiments, the source node types may include, but are not limited to, a coal-fired power generator, a gas power generator, a nuclear power generator, and a Distributed Energy Resource (DER). Moreover, in further embodiments, the DER types may include, but are not limited to, a wind power generator, a photovoltaic power generator, a biomass power generator, a biogas power generator, a geothermal power generator, a hydroelectric power generator, and an electricity storage system. In the example of FIG. 5, the solar (photovoltaic) power energy model is loaded by way of a node control signal generated by the central controller 105 into an emulator 200 of the type described above with respect to FIG. 2 to configure the emulator as a solar energy source. To emulate a solar power energy source, the emulator 200 may be configured to emulate a Boost configuration including a Boost converter 650, an inverter 655, a filter 660, and an emulated photovoltaic panel 665. Although a Boost configuration is illustrated for emulating a photovoltaic energy source, it will be understood that other power converter embodiments may be emulated as part of an emulation of other types of sources, loads, short circuits or faults in accordance with various embodiments of the inventive concept. In addition to the particular model for the emulator 200, the emulator parameters reconfiguration module 160 may download one or more parameters, data, or other information that may be used to configure and control operation of the programmable emulator 200. These parameters may be used to control the output voltage and/or current levels to tune the programmable emulator 200 to better simulate a desired energy source, load, and/or short circuit.

Figure 7:
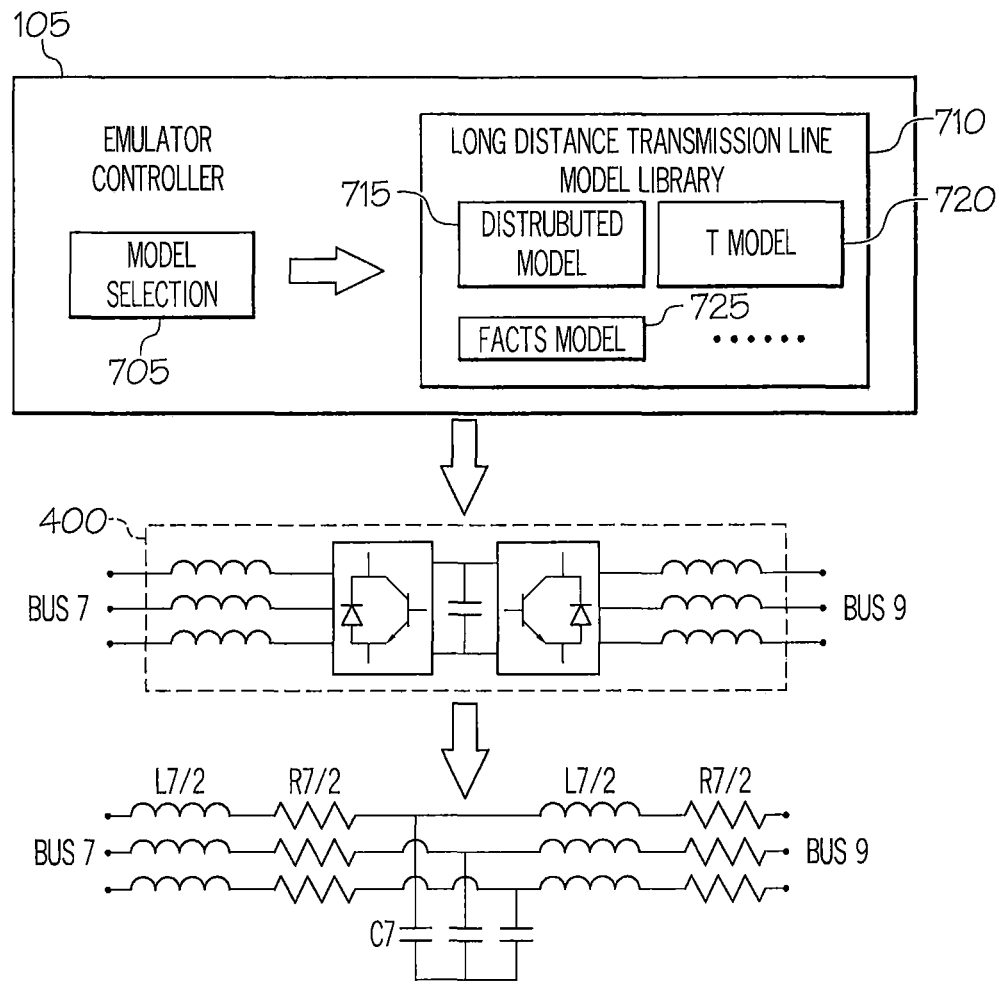
FIG. 7 is a block diagram that illustrates a programming of a programmable emulator as a long-distance T model transmission line according to some embodiments of the inventive concept.

FIG. 7 is a block diagram that illustrates a programming of a programmable emulator, such as the programmable emulators 131 and 132 of FIG. 1C, for use as a long-distance transmission line in an emulation platform according to some embodiments of the inventive concept. The programmable emulators 133 and 134 may be programmed in a similar manner to emulate a DC line and/or a high voltage DC converter responsive to a DC line or DC high voltage converter control signal from the central controller 105. Similar to the node configuration illustrated in FIG. 6, the emulator reconfiguration module 150 along with the emulator parameters reconfiguration module 160 of FIG. 1C may include a library that can be used to program the emulators in the Type III cabinet 110c to serve as a long-distance transmission line in an electrical system, such as an electrical power grid. Thus, the emulator reconfiguration module 150 along with the emulator parameters reconfiguration module 160 may incorporate access to a model selection module 705 to select among a library 710 of various long-distance transmission line types that can be used for configuring the Type III cabinet 110c emulators. As shown in FIG. 7, a distributed model 715, a T model 720, and a Flexible Alternating Current Transmission Systems (FACTS) model are shown with the T model 720 being selected. It will be understood, however, that the various types of long-distance transmission lines are not limited to these particular models. Other types of long-distance transmission line models may be used in accordance with other embodiments of the inventive concept. In the example of FIG. 7, the T model long-distance transmission line model is loaded by way of a long-distance transmission line control signal into an emulator 400 of the type described above with respect to FIG. 4 to operate the emulator power converter pairs included therein as a T model long-distance transmission line. The power converters 405a and 405b are configured so that in conjunction with the filter inductors 410a and 410b the emulated long-distance transmission line has an equivalent circuit corresponding to the inductors R7, L7, and C7 configured as shown in FIG. 7.

Figure 8:
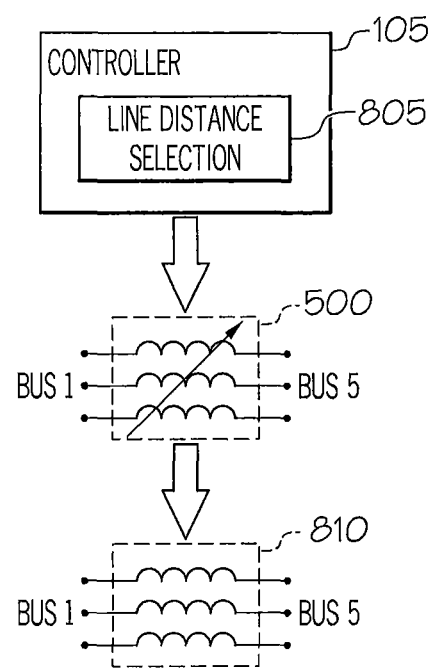
FIG. 8 is a block diagram that illustrates a programming of a programmable emulator as a short-distance transmission line according to some embodiments of the inventive concept.

FIG. 8 is a block diagram that illustrates a programming of a programmable emulator, such as the programmable emulators 120 and 122 of FIG. 1B, for use as a short-distance transmission line in an emulation platform according to some embodiments of the inventive concept. Similar to the node configuration illustrated in FIG. 6 and the long-distance transmission line configuration illustrated in FIG. 7, the emulator reconfiguration module 150 along with the emulator parameters reconfiguration module 160 of FIG. 1 may include a line distance selection module 805 that is configured to program the length of the inductors included in the programmable emulator 500, which may be used to implement the programmable emulators 120 and 122 in the Type II cabinet of FIG. 1B. In the example of FIG. 8, the switches S(k+1), S(k+2), S(k+3), S(k+4) of FIG. 1B are configured in an open or closed state based on a short-distance transmission line signal generated by the central controller 105 to adjust the inductive length of the inductors of the programmable emulator 500 to generate a programmed emulator 810 that emulates a short-distance transmission line with an inductive length of L8.

Figure 9:
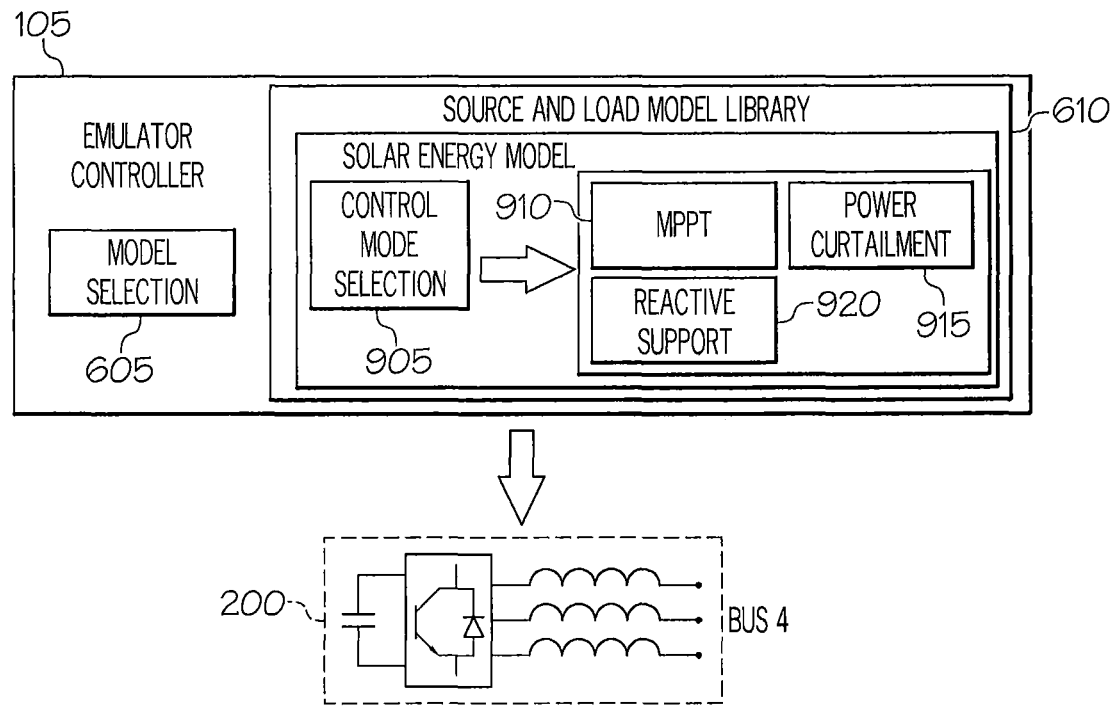
FIG. 9 is a block diagram that illustrates a programming of an operation mode of a programmable emulator configured as a power generator according to some embodiments of the inventive concept.

FIG. 9 is a block diagram that illustrates a further programming of a programmable emulator, such as the programmable emulators 111, 112, and 113 of FIG. 1A to specify an operating mode of a node for emulation in an emulation platform according to some embodiments of the inventive concept. The library 610 of FIG. 6 may further include an operational mode selection capability for the various node types. In the example shown in FIGS. 6 and 9, a control mode selection model 905 may be used to select among a library 610 of various operational mode types that can be used for configuring Type I cabinet 110a emulators. As shown in FIG. 9, the operating modes may include, but are not limited to, a Maximum Power Point Tracking (MPPT) mode 910, a power curtailment mode 915, and a reactive power support mode 920. Other operations modes may include, but are not limited to, a power curtailment mode, a droop control mode, an inertia emulation mode, a power factor control mode, a voltage control mode, and a frequency control mode. Although illustrated with respect to a node being configured as a solar or photovoltaic generator, it will be understood that the operating modes are applicable to other types of generator, energy storage, or load types in accordance with various embodiments of the inventive concept. In the example of FIG. 9, the MPPT operating mode 910 model is loaded by way of a mode control signal generated by the central controller 105 into an emulator 200 of the type described above with respect to FIG. 2 to operate the emulator as a solar energy source with an MPPT operating mode.

Figure 10:
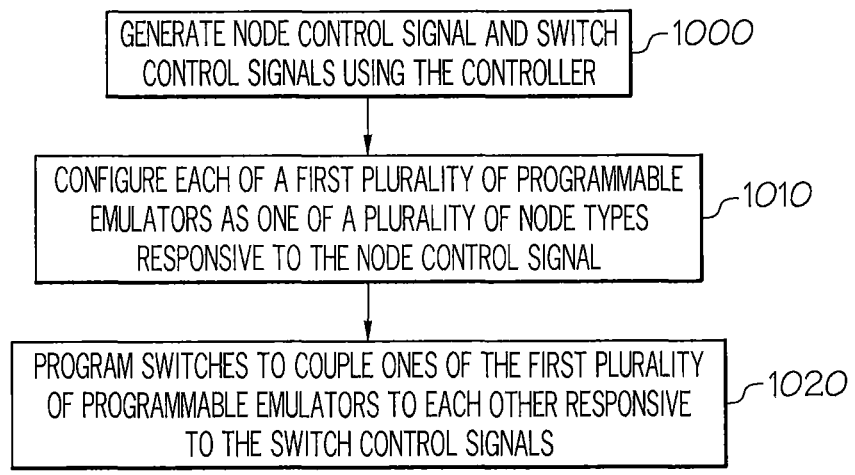
FIGS. 10 and 11 are flowcharts that illustrate operations of a power electronics converter based reconfigurable grid emulation platform according to some embodiments of the inventive concept.
Figure 11:
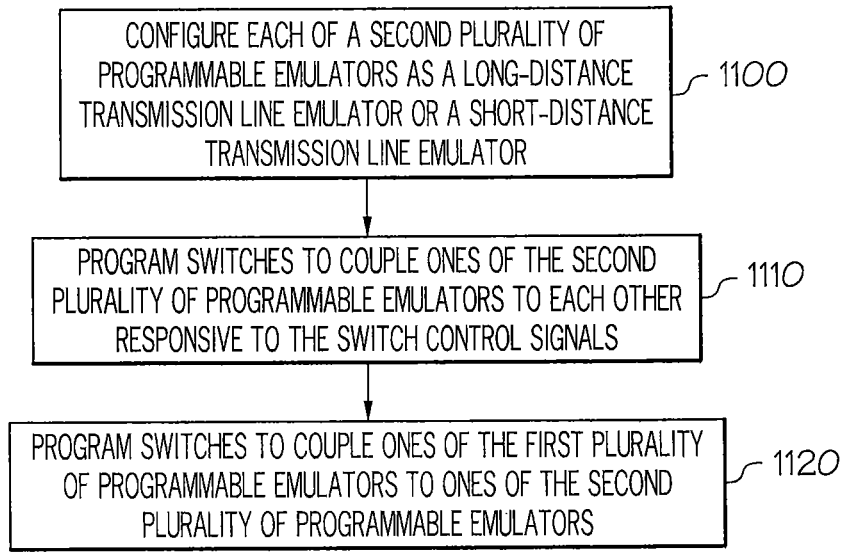

FIGS. 10 and 11 are flowcharts that illustrate operations of a power electronics converter based reconfigurable grid emulation platform according to some embodiments of the inventive concept. Referring to FIG. 10, operations begin at block 1000 where the central controller 105 generates one or more node control signals for configuring one or more emulators in the Type I cabinet 110a, i.e., a first plurality of emulators, as particular node types, such as sources (e.g., power generators), loads, energy storage, and/or short circuits. At block 1010, the power converters in the one or more emulators in the Type I cabinet are configured in accordance with the one or more node types specified by the central controller 105. The central controller 105 generates switch control signals to program the switches in the grid emulation platform to couple ones of the programmable emulators together at block 1020. Referring now to FIG. 11, operations begin at block 1100 where the one or more emulators in the Type III and Type II cabinets 110c and 110b, respectively, are operated as long-distance transmission line emulators, DC lines, high voltage DC converters and/or short-distance transmission line emulators, i.e., second plurality of emulators, responsive to one or more long-distance transmission line control signals, DC line control signals, DC converter control signals and/or short-distance transmission line control signals, respectively, generated by the central controller 105. The central controller 105 generates switch control signals to program the switches in the grid emulation platform to couple ones of the second plurality of programmable emulators together at block 1110 and generates switch control signals to program the switches in the grid emulation platform to couple ones of the first plurality of programmable emulators to ones of the second plurality of programmable emulators at block 1120.

Figure 12:
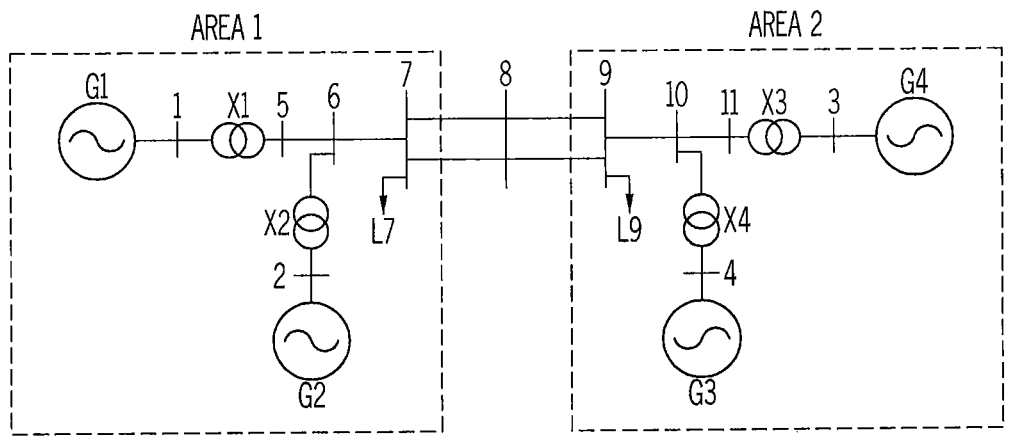
FIG. 12 is a diagram of a two-area power generation grid for emulation according to some embodiments of the inventive concept.
Figure 13A:
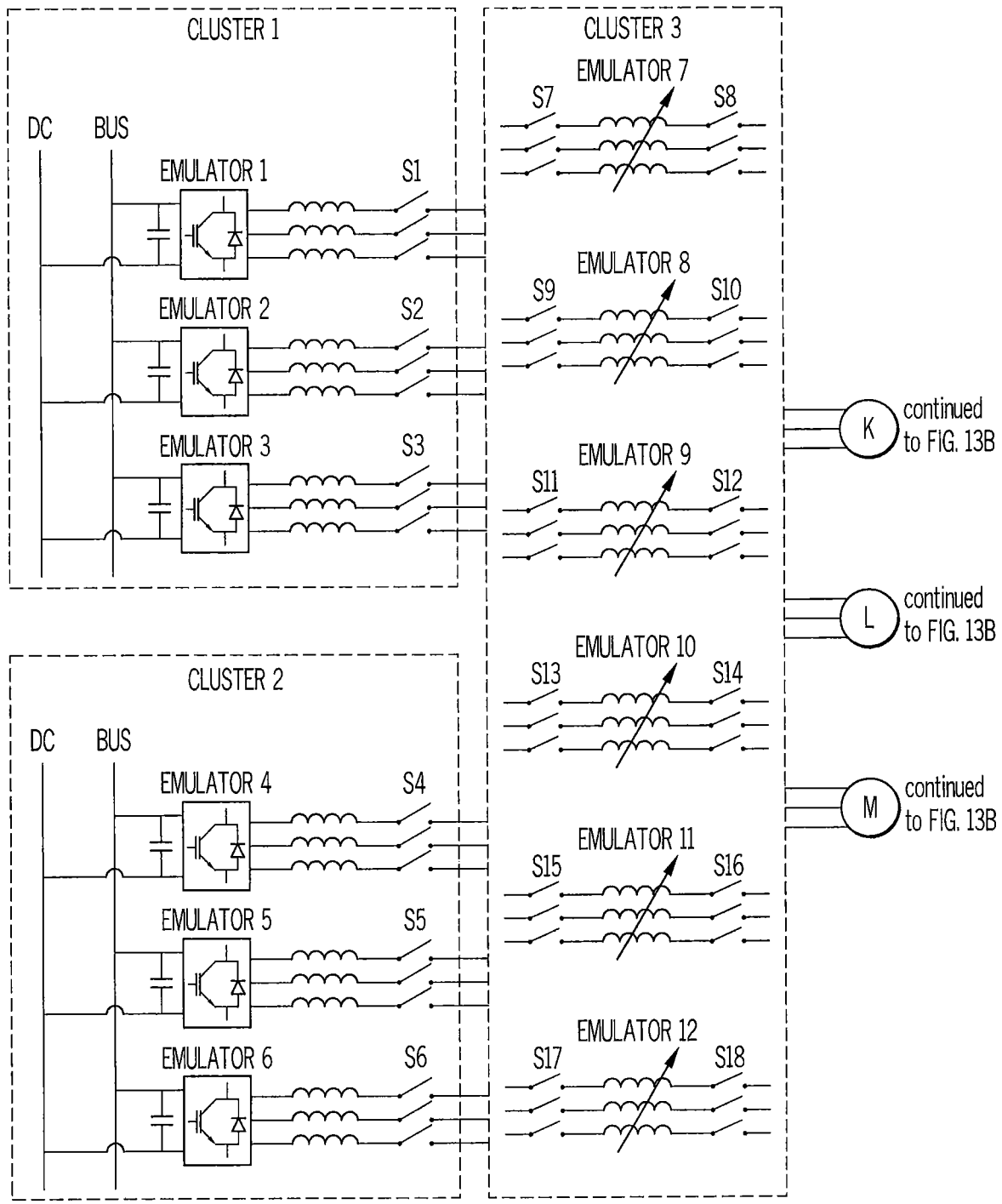
FIGS. 13A and 13B illustrate programmable emulators of the power electronics converter based reconfigurable grid emulation platform of FIG. 1 for use in emulating the two-area power generation grid of FIG. 12 according to some embodiments of the inventive concept.
Figure 13B:
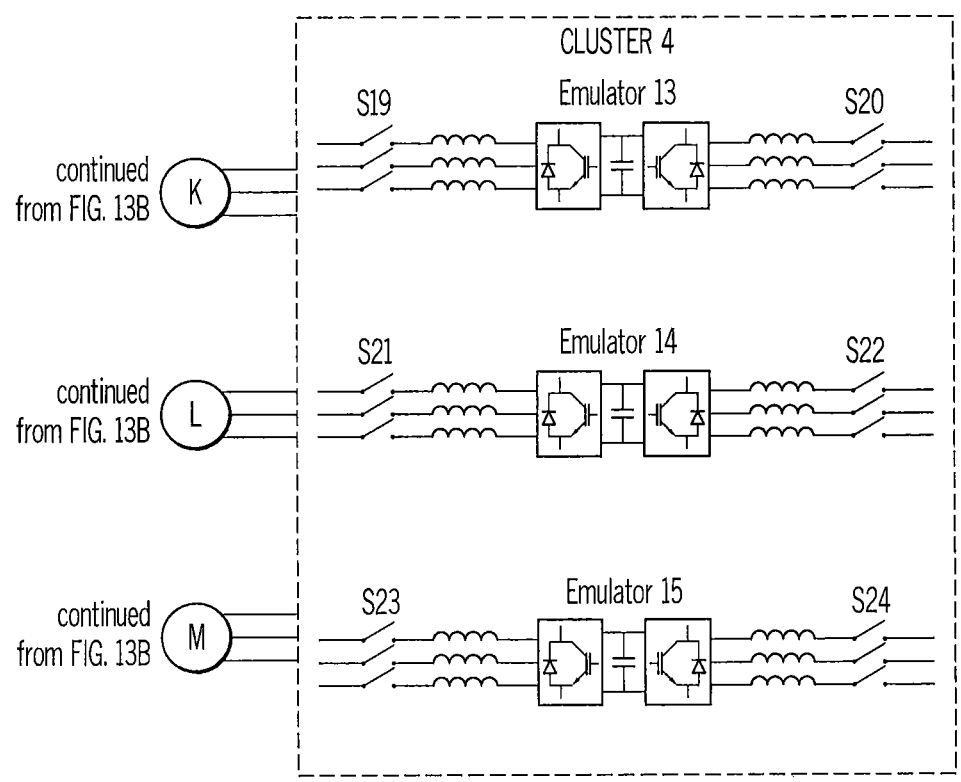
Figure 14A:
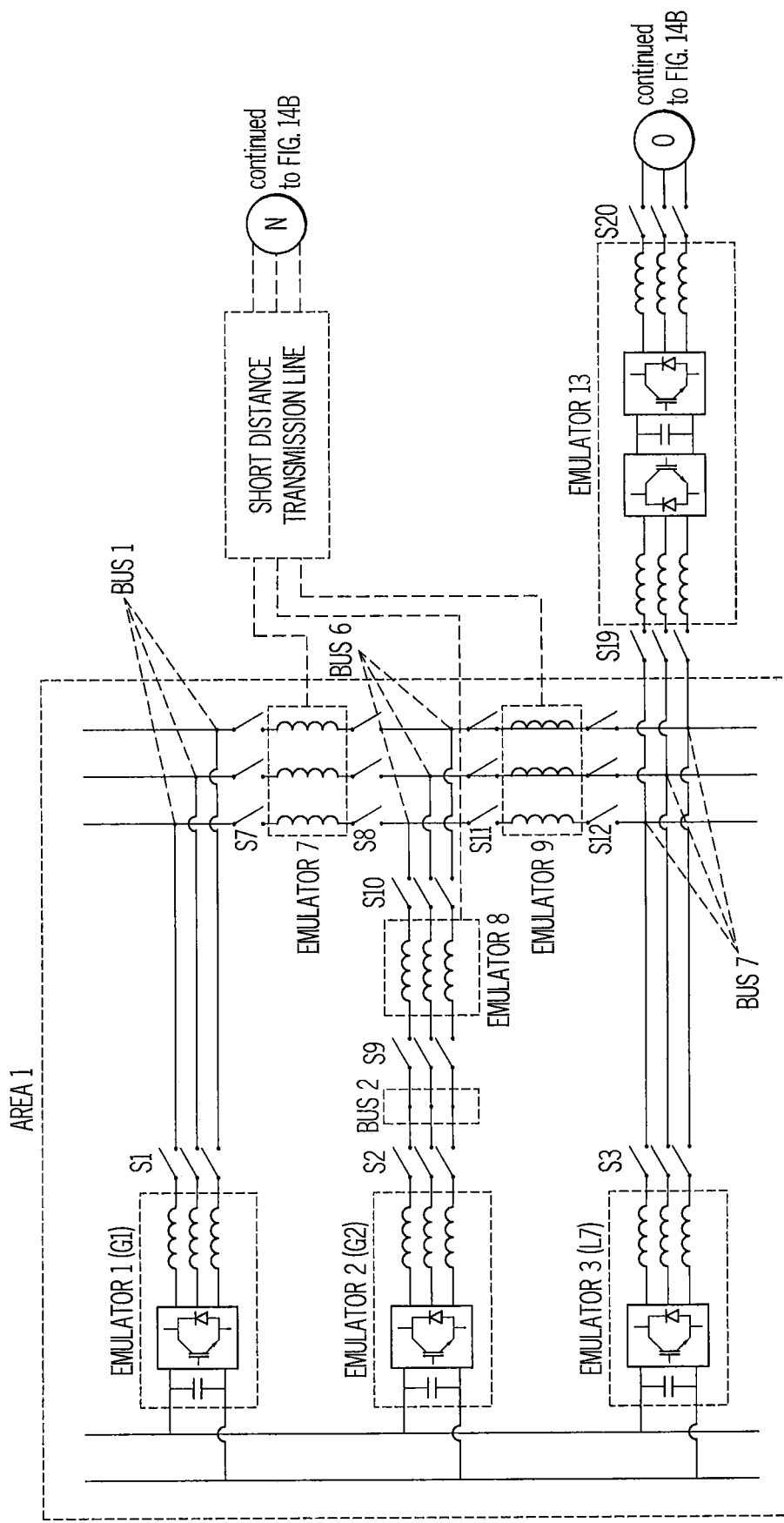
FIGS. 14A and 14B illustrate an interconnection of the programmable emulators of FIGS. 13A and 13B for emulating the two-area power generation grid of FIG. 12 according to some embodiments of the inventive concept.
Figure 14B:
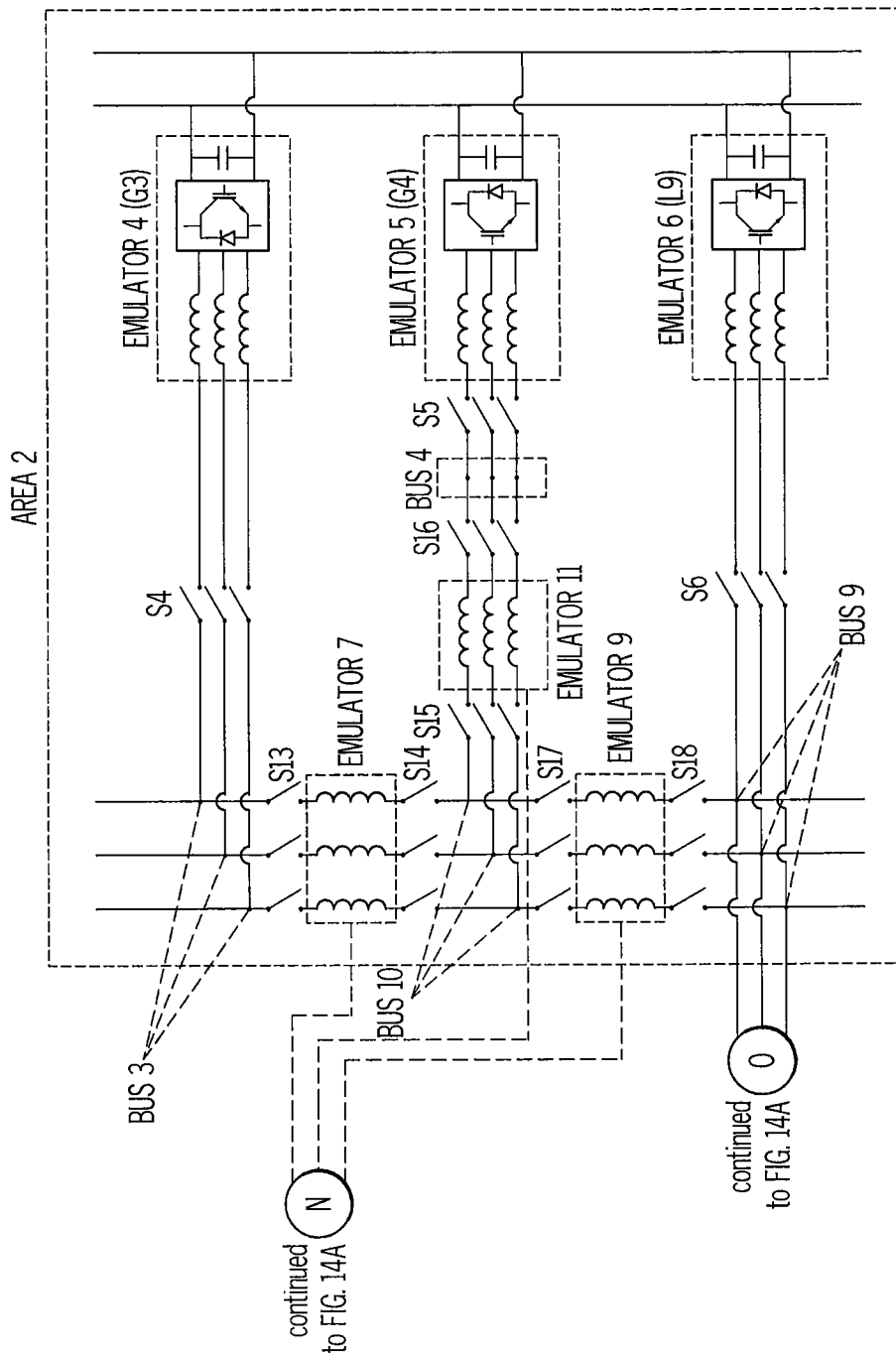

Embodiments of the inventive concept may be illustrated by way of example. Referring to FIG. 12, a two-area power generation grid for emulation includes four power generators G1, G2, G3, and G4 and two loads L7 and L9 that are connected by various buses, switches, and transmission lines 1-11 and X1-X4, which may be transformers emulated in transmission lines. Referring to FIG. 13, the central controller 105 may select source and load emulators from the Type I Cabinet 110a to emulate the power generators G1-G4 and loads L7 and L9 of FIGS. 1A, 1B, 1C, may select short-distance transmission line emulators from the Type II cabinet 110b to emulate short-distance transmission lines to connect elements of the emulated two-area power generation grid of FIG. 12 together, and may select long-distance transmission line emulators from the Type III cabinet 110c to connect elements of the emulated two-area power generation grid of FIG. 12 together. In the example shown in FIGS. 13A and 13B, six emulators (Emulators 1-6) across Clusters 1 and 2 are selected from the Type I cabinet, six emulators (Emulators 7-12) from Cluster 3 are selected from the Type II cabinet, and three emulators (Emulators 13-15) from Cluster 4 are selected from the Type III cabinet. As will be described below, the various emulators may be allocated in clusters based on connections to system power and other supporting infrastructure, but not all emulators in a cluster may be used in a particular emulation. The central controller 105 may selectively program switches S1-S24 to connect the various emulators 1-16 together to match the topological configuration of the two-area power generation grid of FIG. 12. Referring to FIGS. 14A and 14B, the central controller 105 programs switches S1, S2, S3, and S7-S12 to connect Emulators 1-3 as generators G1, G2, and load L7, respectively, to emulate Area 1 of FIG. 12. Emulators 7-9 are connected between Emulators 1-3 to emulate short-distance transmission lines in Area 1. Similarly, the central controller 105 programs switches S4-S6 and S13-S18 to connect Emulators 4-6 as generators G3, G4, and load L9, respectively, to emulate Area 2 of FIG. 12. Emulators 10-12 are connected between Emulators 4-6 to emulate short-distance transmission lines in Area 2. The controller programs switches S19 and S20 to couple the Area 1 emulated elements to the Area 2 emulated elements using Emulator 13 to emulate a long-distance transmission line. In addition, the central controller 105 may use control signals to communicate with each of the emulators (Emulators 1-13) to configure the emulators emulate the voltage and/or current characteristics associated with the various generators, loads, transmission lines, etc. of the two-area power generation grid of FIG. 12. Thus, some embodiments of the inventive concept may provide a flexible power electronics converter based grid emulation platform that may use modular emulators that may be programmed to emulate components of an electrical system, including source (generator), load, short circuit, and connectivity components. Moreover, these emulators may be connected to and disconnected from each other using a network of programmable switches, which may allow emulation of numerous types of electrical system topologies through use of a controller without the need to manually configure the emulators.

Figure 15:
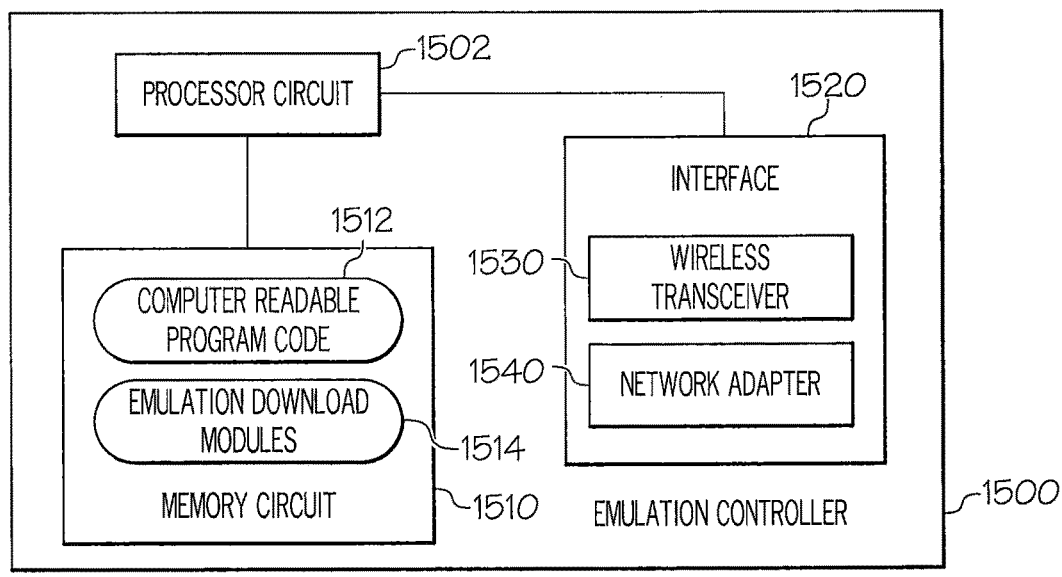
FIG. 15 is a simplified block diagram of the controller used in the power electronics converter based reconfigurable grid emulation platform of FIGS. 1A, 1B, 1C according to some embodiments of the inventive concept.

FIG. 15 is a simplified block diagram of the central controller 105 used in the power electronics converter based reconfigurable grid emulation platform of FIGS. 1A, 1B, 1C that is configured to perform operations according to one or more embodiments disclosed herein according to some embodiments of the inventive concept. The controller 1500 comprises a processor circuit 1502, a memory circuit 1510, and an interface 1520. The interface 1520 comprises a wireless transceiver 1530 and a network adapter 1540. The wireless transceiver 1530 and the network adapter 1540 may be configured to provide the controller 1500 with wireless and wireline communication functionality, respectively. In some embodiments, the interface 1520 may support a Joint Test Action Group (JTAG) port for communication. The processor circuit 1502 may comprise one or more data processing circuits, such as a general purpose and/or special purpose processor, e.g., microprocessor and/or digital signal processor. The processor circuit 1502 is configured to execute computer readable program code 1512 and emulation download modules 1514 (e.g., signals, data, and other information to configure programmable emulators with particular voltage, current, short-circuit, and/or operating mode characteristics) in the memory circuit 1510 to perform at least some of the operations described herein as being performed by the central controller 105.

Figure 16:
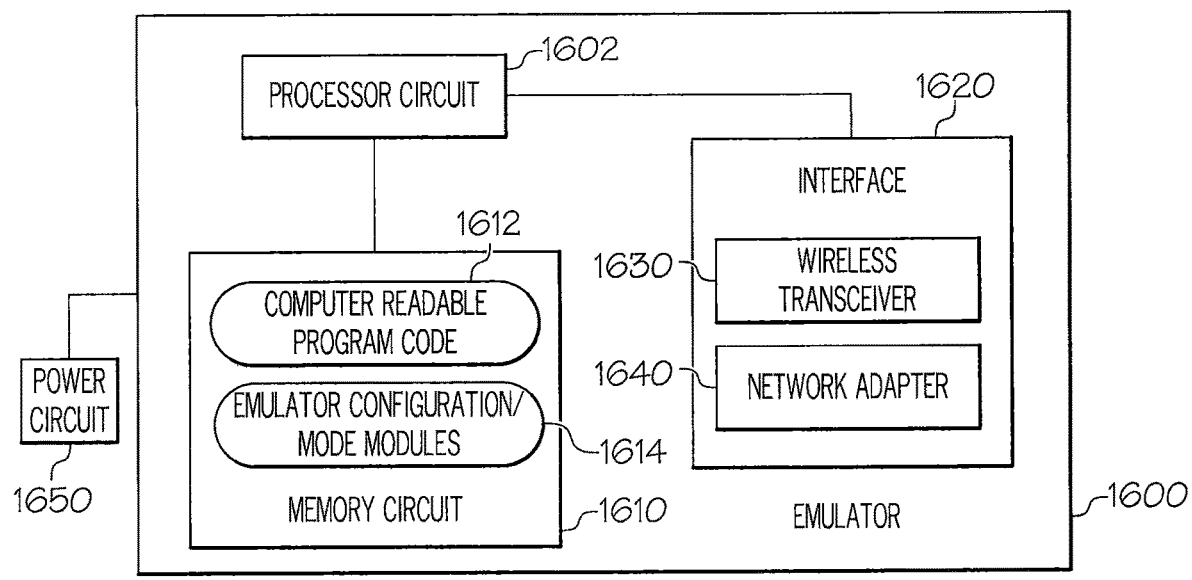
FIG. 16 is a simplified block diagram of a programmable emulator used in the power electronics converter based reconfigurable grid emulation platform of FIGS. 1A, 1B, 1C according to some embodiments of the inventive concept.

FIG. 16 is a simplified block diagram of a programmable emulator used in the power electronics converter based reconfigurable grid emulation platform of FIGS. 1A, 1B, 1C that is configured to perform operations according to one or more embodiments disclosed herein according to some embodiments of the inventive concept. The emulator 1600 comprises a processor circuit 1602, a memory circuit 1610, and a network interface 1620, which may receive DC power through the power circuit 1650. The network interface 1620 comprises a wireless transceiver 1630 and a network adapter 1640. The wireless transceiver 1630 and the network adapter 1640 may be configured to provide the emulator 1600 with wireless and wireline communication functionality, respectively. The processor circuit 1602 may comprise one or more data processing circuits, such as a general purpose and/or special purpose processor, e.g., microprocessor and/or digital signal processor. The processor circuit 1602 is configured to execute computer readable program code 1612 and emulation configuration/mode modules 1614 (e.g., signals, data, and other information received from the central controller 105 to configure programmable emulators with particular voltage, current, short-circuit, and/or operating mode characteristics) in the memory circuit 1610 to perform at least some of the operations described herein as being performed by an emulator.

Some embodiments of the inventive concept may provide a power electronics converter based reconfigurable grid emulation platform that, when compared with purely digital or software simulations, provides better test stability and doesn't have similar numerical stability and convergence issues attendant to such simulations. When compared with purely hardware based emulation platforms, the power electronics converter based reconfigurable grid emulation platform may provide greater flexibility, improved cost efficiency, and a smaller implementation size. Moreover, the platform may emulate short circuit faults at buses or lines, including single-phase to ground, double line-to-ground, line-to-line, and three-phase faults. Embodiments of the inventive concept may also provide protective functions, such as, but not limited to, undervoltage, overcurrent, overfrequency, and underfrequency.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium, may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, LabVIEW, dynamic programming languages, such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive subject matter.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present disclosure of embodiments has been presented for purposes of illustration and description, but is not intended to be exhaustive or limited to the disclosure in the form disclosed. Many variations and modifications can be made to the embodiments without substantially departing from the principles of the present invention. All such variations and modifications are intended to be included herein within the scope of the present invention.

What is claimed is:

1. A system, comprising:
   a controller that is configured to generate a node control signal and a plurality of switch control signals;
   a first plurality of programmable emulators, each of the plurality of programmable emulators being configurable as one of a plurality of node types responsive to the node control signal;
   a second plurality of programmable emulators, each of the second plurality of programmable emulators being configurable as a long-distance transmission line emulator, a Direct Current (DC) line emulator, a high voltage DC converter emulator, or a short-distance transmission line emulator; and
   a plurality of switches that are programmable to couple ones of the first plurality of programmable emulators to each other responsive to the plurality of switch control signals, to couple ones of the second plurality of programmable emulators to each other responsive to the plurality of switch control signals from the controller, and to couple the ones of the first plurality of programmable emulators to the ones of the second plurality of programmable emulators to each other responsive to the plurality of switch control signals from the controller.

2. The system of claim 1, wherein the long-distance transmission line emulator, DC line emulator, and high voltage DC converter emulator each comprise a pair of power converters coupled together.

3. The system of claim 2, wherein the controller is further configured to generate a long distance transmission line control signal; and
   wherein the long-distance transmission line emulator is configurable as a T model transmission line, a distributed model transmission line, or a Flexible Alternating Current Transmission System (FACTS) model transmission line responsive to the long distance transmission line control signal.

4. The system of claim 1, wherein the short-distance transmission line emulator comprises at least one inductor.

5. The system of claim 4, wherein the controller is further configured to generate a short-distance transmission line signal;
   wherein the short-distance transmission line emulator comprises a plurality of inductors; and
   wherein the plurality of switches are further programmable to couple ones of the plurality of inductors to each other to adjust a transmission line length of the short-distance transmission line emulator responsive to the short-distance transmission line signal.

6. The system of claim 1, wherein the plurality of node types comprises a plurality of sources and a plurality of loads.

7. The system of claim 6, wherein the plurality of sources comprises a coal-fired power generator, a gas power generator, a nuclear power generator, and a plurality of distributed energy resources.

8. The system of claim 7, wherein the plurality of distributed energy resources comprises a wind power generator, a photovoltaic power generator, a biomass power generator, a biogas power generator, a geothermal power generator, a hydroelectric power generator, and an electricity storage system.

9. The system of claim 8, wherein the electricity storage system comprises a battery, an ultracapacitor, a flywheel, a compressed air storage device, and/or a responsive load.

10. The system of claim 6, wherein the plurality of loads comprises a constant impedance load, a constant current load, a constant power load, a three-phase induction motor load, a single-phase induction motor load, and/or a power electronic fed load.

11. The system of claim 10, wherein the power electronic fed load comprises a variable speed drive, a data center power supply, a consumer electronics power supply, and/or an electric vehicle charger.

12. The system of claim 1, wherein each of the plurality of programmable emulators comprises a power converter.

13. The system of claim 12, wherein the power converter comprises a three-phase Direct Current/Alternating Current (DC/AC) converter.

14. The system of claim 1, wherein the controller is further configured to generate a mode control signal;
   wherein each of the plurality of programmable emulators is further configurable as one of a plurality of operating modes responsive to the mode control signal.

15. The system of claim 14, wherein the plurality of operating modes comprises Maximum Power Point Tracking (MPPT), power curtailment, droop control, inertia emulation, power factor control, voltage control, frequency control, and/or reactive power support.

16. The system of claim 1, further comprising:
   a Real Time Digital Simulation (RTDS) system that is coupled to the plurality of programmable emulators and is configured to digitally emulate a power system source, load, or fault.

17. A method, comprising:
   generating, using a controller, a node control signal and a plurality of switch control signals;
   configuring each of a first plurality of programmable emulators as one of a plurality of node types responsive to a node control signal from a controller responsive to the node control signal;
   configuring each of a second plurality of programmable emulators as a long-distance transmission line emulator, a Direct Current (DC) line emulator, a high voltage DC converter emulator, or a short-distance transmission line emulator;
   programming a plurality of switches to couple ones of the programmable emulators to each other responsive to the plurality of switch control signals;
   programming the plurality of switches to couple ones of the second plurality of programmable emulators to each other responsive to the plurality of switch control signals; and
   programming the plurality of switches to couple the ones of the first plurality of programmable emulators to the ones of the second plurality of programmable emulators to each other responsive to the plurality of switch control signals.

18. The method of claim 17, wherein the long-distance transmission line emulator, DC line emulator, and high voltage DC converter emulator each comprise a pair of power converters coupled together.

19. The method of claim 17, further comprising:
generating, using the controller, a long-distance transmission line control signal; and
configuring the long-distance transmission line emulator as a T model transmission line, a distributed model transmission line, or a Flexible Alternating Current Transmission System (FACTS) model transmission line responsive to a long-distance transmission line control signal from the controller.

20. The method of claim 17, wherein the short-distance transmission line emulator comprises at least one inductor.

21. The method of claim 20, wherein the short-distance transmission line emulator comprises a plurality of inductors, the method further comprising:
generating, using the controller, a short-distance transmission line signal; and
programming the plurality of switches to couple ones of the plurality of inductors to each other to adjust a transmission line length of the short-distance transmission line emulator responsive to the short-distance transmission line signal.

22. The method of claim 17, further comprising:
generating, using the controller, a mode control signal; and
configuring each of the plurality of programmable emulators as one of a plurality of operating modes responsive to the mode control signal.

23. A computer program product, comprising:
a non-transitory computer readable storage medium comprising computer readable program code embodied in the medium that is executable by a processor to perform operations comprising:
generating, using a controller, a node control signal and a plurality of switch control signals;
configuring each of a first plurality of programmable emulators as one of a plurality of node types responsive to a node control signal from a controller responsive to the node control signal;
configuring each of a second plurality of programmable emulators as a long-distance transmission line emulator, a Direct Current (DC) line emulator, a high voltage DC converter emulator, or a short-distance transmission line emulator;
programming a plurality of switches to couple ones of the programmable emulators to each other responsive to the plurality of switch control signals;
programming the plurality of switches to couple ones of the second plurality of programmable emulators to each other responsive to the plurality of switch control signals; and
programming the plurality of switches to couple the ones of the first plurality of programmable emulators to the ones of the second plurality of programmable emulators to each other responsive to the plurality of switch control signals.

24. A system, comprising:
a controller that is configured to generate a node control signal and a plurality of switch control signals;
a plurality of programmable emulators, each of the plurality of programmable emulators being configurable as one of a plurality of node types responsive to the node control signal;
a plurality of switches that are programmable to couple ones of the plurality of programmable emulators to each other responsive to the plurality of switch control signals; and
a Real Time Digital Simulation (RTDS) system that is coupled to the plurality of programmable emulators and is configured to digitally emulate a power system source, load, or fault.

25. The system of claim 24, wherein the plurality of node types comprises a plurality of sources and a plurality of loads.

26. The system of claim 25, wherein the plurality of sources comprises a coal-fired power generator, a gas power generator, a nuclear power generator, and a plurality of distributed energy resources; and
wherein the plurality of loads comprises a constant impedance load, a constant current load, a constant power load, a three-phase induction motor load, a single-phase induction motor load, and/or a power electronic fed load.

* * * * *